(12) United States Patent
Manoharan et al.

(10) Patent No.: US 10,861,442 B2
(45) Date of Patent: Dec. 8, 2020

(54) AUTOMATED CHAT BOT PROCESSING

(71) Applicant: Visa International Service Association, San Francisco, CA (US)

(72) Inventors: Hemanth Kumar Manoharan, Bengaluru (IN); Melroy Benedict Tellis, Mumbai (IN)

(73) Assignee: Visa International Service Association, San Francisco, CA (US)

( * ) Notice: Subject to any disclaimer, the term of this patent is extended or adjusted under 35 U.S.C. 154(b) by 114 days.

(21) Appl. No.: 16/182,396

(22) Filed: Nov. 6, 2018

(65) Prior Publication Data
US 2020/0143797 A1    May 7, 2020

(51) Int. Cl.
*G10L 15/22*   (2006.01)
*G10L 15/16*   (2006.01)
*G06F 9/451*   (2018.01)

(52) U.S. Cl.
CPC .............. *G10L 15/16* (2013.01); *G06F 9/453* (2018.02); *G10L 15/22* (2013.01)

(58) Field of Classification Search
CPC .... G06F 3/167; G10L 15/22; G10L 2015/223
See application file for complete search history.

(56) References Cited

U.S. PATENT DOCUMENTS

| | | | | |
|---|---|---|---|---|
| 8,219,407 B1 * | 7/2012 | Roy | ...................... | H04L 12/282 704/275 |
| 2002/0163500 A1 | 11/2002 | Griffith | | |
| 2014/0164476 A1 * | 6/2014 | Thomson | ............. | G06Q 10/101 709/203 |
| 2014/0164508 A1 * | 6/2014 | Lynch | ............... | H04L 29/08081 709/204 |
| 2014/0244712 A1 * | 8/2014 | Walters | ................... | H04L 67/10 709/202 |
| 2014/0250195 A1 | 9/2014 | Capper et al. | | |
| 2015/0186154 A1 * | 7/2015 | Brown | ................ | G06F 3/04817 715/706 |
| 2015/0186156 A1 | 7/2015 | Brown et al. | | |
| 2015/0215350 A1 * | 7/2015 | Slayton | ................... | G06F 9/453 709/204 |
| 2017/0289069 A1 | 10/2017 | Plumb et al. | | |

FOREIGN PATENT DOCUMENTS

KR    20180034917    4/2018

OTHER PUBLICATIONS

PCT/US2019/059917, "International Search Report and Written Opinion", dated Apr. 8, 2020, 10 pages.

* cited by examiner

*Primary Examiner* — Jialong He
(74) *Attorney, Agent, or Firm* — Kilpatrick Townsend & Stockton LLP

(57) ABSTRACT

Methods and computing systems are disclosed for a digital assistant platform that includes a cross-platform bot that can be used to bridge existing chat-bot platforms. The cross-platform bot would have its own single set of protocols and standards, such that a developer of a task-specific bot would only need to integrate with the cross-platform bot to enable its use across all the different chat-bot platforms. The cross-platform bot would enable the task-specific bots to coordinate to combine their functionality, while end users may continue using an existing chat-bot platform of their choice.

19 Claims, 6 Drawing Sheets

AUTOMATED CHAT BOT PROCESSING

CROSS-REFERENCE TO RELATED APPLICATIONS

None.

BACKGROUND

Today, there are numerous different virtual assistants or chat bot platforms that are in use (e.g., Alexa from Amazon, Google Assistant from Google, Cortana from Microsoft, etc.). Users of these chat bot platforms may typically direct the chat bot platform of their choice to perform various tasks by issuing commands. Task specific bots that third-party developers have specifically developed for that chat bot platform may be used to carry out some commands. For instance, a user may ask the chat bot platform to book them a ride-share, which would be done by a task specific bot (e.g., an Uber bot developed for that chat bot platform).

However, the existence of multiple different chat bot platforms places a tremendous burden on these third-party developers of task specific bots. Since the chat bot platforms may have be associated with different libraries, standards, and protocols, a third-party developer of a task specific bot looking to integrate their task specific bot across multiple chat bot platforms must custom-tailor the task specific bot to each chat bot platform. Furthermore, having multiple chat bot platforms makes it difficult for a developer to integrate the functionality of other developers' bots into their own task specific bot.

Thus, there exists a need for a way to make it easier to adapt task specific bots to various chat bot platforms, while also making it easier for different task specific bots to coordinate with one another to perform the tasks issued by the user.

BRIEF SUMMARY

The present disclosure contemplates methods and computing systems for a cross-platform bot that can be used as the backend for different chat bot platforms. This cross-platform bot is able to receive user input from various chat bot platforms and determine the appropriate task specific bot to use for carrying out the user's instructions. The cross-platform bot has its own set of task specific bots adapted to its own standards and protocols, such that any developer of a task specific bot would only need to integrate their task specific bot with the cross-platform bot to enable its use across all the different chat bot platforms.

In some embodiments, the cross-platform bot may include a standardized command interface that developers of task specific bots would have to follow, along with the appropriate security/authentication mechanisms. In some embodiments, the cross-platform bot may include a bot registry, which is a list of all available task specific bots. Once a developer has created a task specific bot that works with the cross-platform bot, the developer can register their task specific bot with the bot registry. The bot registry informs the cross-platform bot about all the various task specific bots that have been registered and each task specific bot's capabilities and purpose.

It is contemplated that having a standardized, cross-platform bot interface with various chat bot platforms and serve as the "brains" for each chat bot platform will provide the above-described benefits for task specific bot developers, while also enabling end users to continue to use the chat bot platform of their familiarity and choice. In particular, a user may issue a conversational command to the chat bot platform of their choice, which would forward the command to the cross-platform bot. In some cases, the user's conversational command may provide clear instructions and have a clearly-discernible context to it (e.g., the desired task specific bot to use is indicated or obvious from the user's command, and the task and its associated parameters may also be indicated or obvious). In some embodiments, the cross-platform bot may receive the command and may be able to quickly determine the desired task specific bot (e.g., by comparing the command to a conversation context store) and then forward the command to that desired task specific bot.

However, in other cases, the user's conversational command may not have a clear context to it. In some embodiments, the cross-platform bot may have an intent analyzer module that can be used to analyze and determine the intent of the user. Once the underlying intent of the user's command and the tasks/actions associated with that intent have been determined, the intent analyzer may search the bot registry in order to find one or more task specific bot(s) that will perform the actions the user is intending. Once the appropriate task specific bot(s) are identified, the user's command can be forwarded to those task specific bot(s).

In some embodiments, there may be several task specific bots that have similar purposes and are capable of serving the same intent. For example, a user may wish to book a cab and there may be multiple task specific bots capable of serving the intent for "booking a cab". There may be a bot exchange tied to the bot registry, which involves a real-time bidding mechanism to help dynamically rate bots by relevance and revenue, similar to online ad systems. The task specific bots that win in the dynamic auction mechanism (which is an example of an interaction mechanism) would then get priority and would be presented in that particular consumer session. Relevance could be based on several factors like bidding, geo-location, customer feedback, and so forth. Thus, the bot exchange allows developers of related task specific bots to bid in auctions to gain increased exposure to users for their task specific bot.

In some cases, the performance of the instructions provided by the user may require the combined functionality of two or more task specific bots. In some embodiments, the cross-platform bot enables task specific bots to perform bot "chaining", or the combination of functionality from different task specific bots in various mash-up scenarios. As an example of chaining, consider a case in which a user may wish to book a reservation at a restaurant. A Restaurant-Booking task specific bot (like Zomato) could chain to a Coupons task specific bot (like Groupon/Nearbuy) for providing 'offers' associated with the restaurant to the user.

In some embodiments, methods and computing systems are contemplated, which involve: obtaining, from a chat-bot platform, a conversational command provided by a user, with the conversational command instructing performance of a task; determining whether the conversational command has a context specifying a task specific bot for performance of the task; upon determining that the conversational command does not have the context, analyzing an intent of the conversational command; determining one or more task specific bots for performance of the task based on the intent of the conversational command and a bot registry, with the bot registry listing the one or more task specific bots and functionality associated with each of the one or more task specific bots; and providing the conversational command to the determined one or more task specific bots for performance of the task.

In various embodiments, the one or more task specific bots are added to the bot registry by a developer of each respective task specific bot. In various embodiments, analyzing the intent of the conversational command includes sending the conversational command to a Neuro-Linguistic Programming (NLP) platform to determine the intent of the conversational command. In various embodiments, analyzing the intent of the conversational command includes referencing the intent of the conversational command in an intent-action map store. In various embodiments, the bot registry further lists the one or more task specific bots based on interactions such as auctions conducted in a bot exchange. In various embodiments, the bot registry further includes auction results associated with the one or more task specific bots, wherein the auction results are conducted in a bot exchange. In various embodiments, the determined one or more task specific bots perform bot chaining for performance of the task. In various embodiments, at least one of the determined one or more task specific bots is a value processing bot. In various embodiments, the conversational command is provided by the user as a voice command.

These and other embodiments are described in detail below.

DETAILED DESCRIPTION

Figure 1:
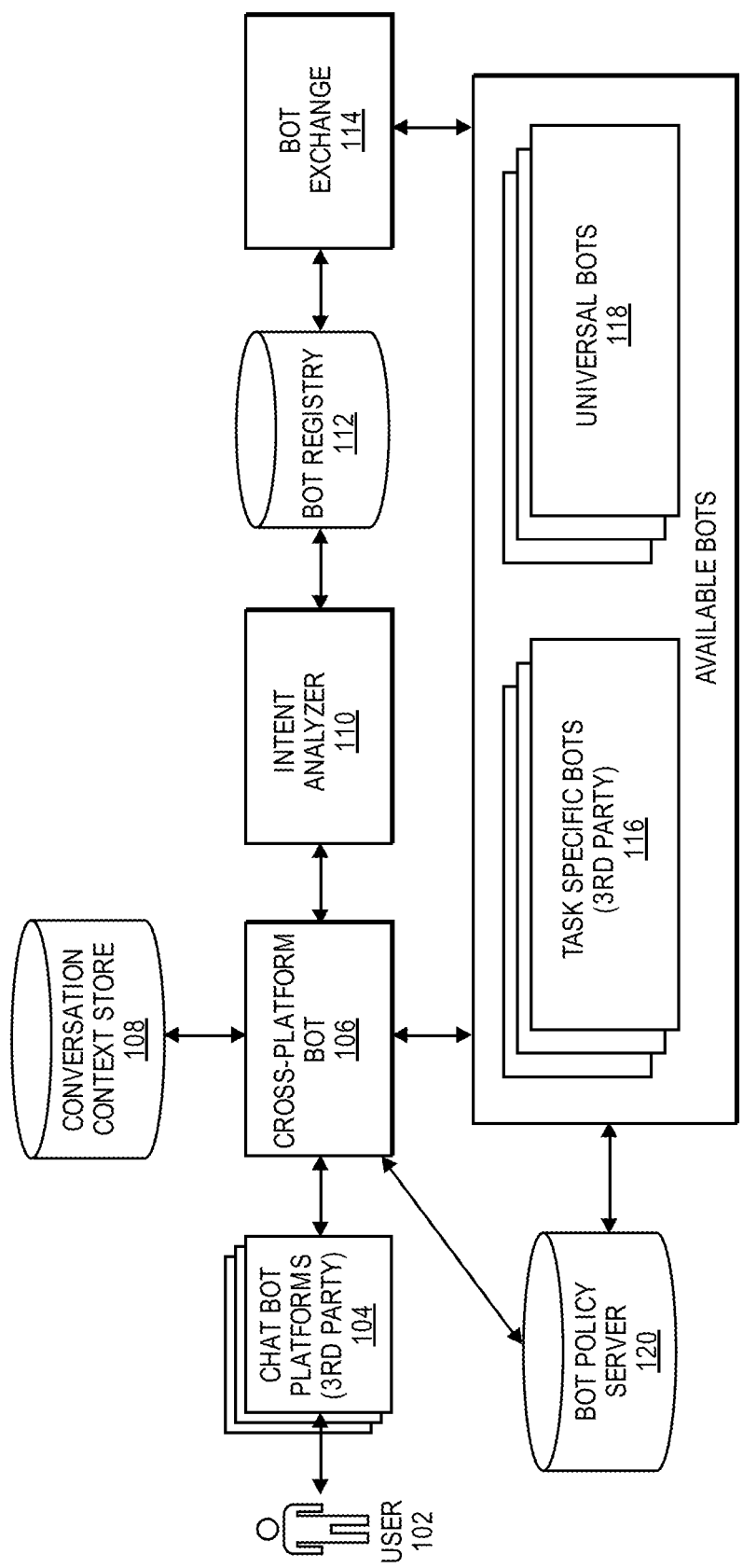
FIG. 1 is a block diagram illustrating a digital assistant platform, in accordance with embodiments of the present disclosure.

A common consumer experience in regards to common tasks like booking a flight trip, booking a cab, or booking a cinema ticket is to launch the relevant application on their mobile device or smart phone. This is a very disparate experience for the consumer because applications typically have a narrow purpose and consumers are forced to keep a large number of applications on their mobile device. Consumers would prefer to have a few 'do-it-all' applications and/or virtual assistants that intelligently bring together all these capabilities.

Accordingly, technology platform providers have been developing virtual assistants or chat bot platforms, which include any software agent that can perform tasks or services for an individual. Instructing a chat bot to complete a specific task typically does not require additional installation to be performed on the mobile device. Users of these chat bot platforms may simply direct the chat bot platform of their choice to perform various tasks by issuing commands. The chat bot may receive commands from the user via any acceptable form of input, such as audio inputs (e.g. speech) or text inputs (e.g., commands typed out using a keyboard or touchscreen). Examples of such chat bots include Apple's Siri, Google's Assistant, Amazon's Alexa, and Microsoft's Cortana.

In order to expand the functionality of a chat bot, the chat bot platform may enable third-party developers to develop task specific bots that can be used to perform very specific tasks or services for the individual. For example, a restaurant may develop a task specific bot that enables users of a chat bot platform to place orders for food and have the food delivered directly to their residence. Many chat bots provide a bot directory for users to browse and search through. Some chat bots offer a way for bot developers to configure their bot to be triggered based on action phrases.

However, the existence of multiple different chat bot platforms places a tremendous burden on these bot developers, since their task specific bots have to be adapted to the standards and protocols of each chat bot platform. It becomes a maintenance problem to build custom integrations for each chat bot platform. The job of bot developers would be easier if there were standard protocols and conventions that all chat bots followed. Furthermore, since not every developer will choose to integrate their task specific bot to every existing chat bot platform, it makes it difficult for a developer to integrate the functionality of other developers' bots into their own task specific bot or have their task specific bot coordinate with other task specific bots.

In the present disclosure, methods and computing systems are proposed for a digital assistant platform that serves as the backend for different chat bot platforms. This digital assistant platform may include a cross-platform bot (e.g., a chat-based or voice-based digital assistant) that is able to receive user input from various chat bot platforms and determine the appropriate task specific bot to use for carrying out the user's instructions. The digital assistant platform may be able to quickly identify the actions/services/tasks that each task specific bot can serve or handle. The cross-platform bot can select from its own set of task specific bots adapted to its own standards and protocols, such that any developer of a task specific bot would only need to integrate their task specific bot with the cross-platform bot to enable its use across all the different chat bot platforms. Thus, different bots that would be otherwise scattered across various platforms are bridged together in a uniform manner by this digital assistant platform. Furthermore, since all the developers would only have to customize their task specific bot for the digital assistant platform, this makes it easier for a developer to keep track of all available task specific bots and integrate the functionality of other task specific bots into their own task specific bot.

Prior to discussing the details of some embodiments of the present invention, description of some terms may be helpful in understanding the various embodiments.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

An "application programming interface" or "API" may be a set of routines, protocols, and tools that specify how system components should interact. The API may allow various components of a system to generate, send, and receive to and from each other in a recognizable format. The API may be preconfigured, installed, or programmed onto a device, and may instruct the device to perform specified operations and networking commands. The API may allow for the request of services by initiating calls to specific instructions or code stored in an application.

A "chat bot" or "chat bot platform" may be any software agent that can perform tasks or services for an individual. The chat bot may interact directly with the individual to receive input from the user (e.g., commands, in the form of speech or text) and provide output to the user (e.g., communicate, in the form of speech or text). As discussed herein, various chat bots may be integrated with a digital assistant platform, which would include a repository of task specific bots for various consumer task completion scenarios. Examples of chat bots may include Apple's Siri and Amazon's Alexa.

A "digital assistant platform" may be a system designed to determine the context or intent associated with a user input received by a chat bot and determine one or more task specific bots to carry out the user input. Developers may be able to build and integrate their task specific bots into the digital assistant platform, and the digital assistant platform may enable various consumer task completion scenarios and transactions (e.g., in the payment space) to be performed by the task specific bots. The digital assistant platform may enforce a few conventions among the task specific bots, such as some standard hooks/actions—which would enable automated bot discovery and bot placement/injection based on consumer intent.

A "cross-platform bot" may be a virtual assistant within the digital assistant platform that may surface at appropriate consumer touchpoints and engagement channels to aid in completion of consumer tasks. The cross platform bot may assist with payment related tasks in particular. The cross-platform bot may be chat-based or voice-based, and it may be available across all devices and platforms based on the various chat bots it is associated with (e.g., in iOS, Android, Facebook, Skype, and so forth). In some embodiments, the cross-platform bot may be configured to communicate with each of the various chat bot platforms, determine the context or intent associated with a user input received by a chat bot, and determine one or more task specific bots to carry out the user input. Thus, instead of a chat bot being configured to perform its own analysis on received user inputs, the chat bot would forward the user input to the cross-platform bot to perform the analysis.

A "task specific bot" may be a bot developed for the purpose of performing a specific task or service for an individual when the individual submits a request through a chat bot platform.

A "universal bot" may be a common bot integrated into a digital assistant platform that can be utilized by task specific bots. A universal bot may be a task specific bot configured for carrying out transactions (e.g., a payment transaction using a credit card payment account). In some embodiments, a universal bot may be integrated with the cross-platform bot and other task specific bots may be able to utilize the universal bot (e.g., through bot chaining) to carry out transactions.

An "issuer" may include a business entity (e.g., a bank) that issues and optionally maintains an account for a user. An issuer may also issue payment credentials stored on a user device, such as a cellular telephone, smart card, tablet, or laptop to the consumer. In some cases, an issuer may issue and maintain a credit card account for a user and provide the user with a credit card to make transactions using the credit card account. In some cases, an issuer may be any financial entity that issues a credit card.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors in to multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

FIG. 1 is a block diagram illustrating a digital assistant platform, in accordance with embodiments of the present disclosure.

In some embodiments, the digital assistant platform may include a cross-platform bot 106. The cross-platform bot 106 may be configured to coordinate and communicate with the chat bot platforms 104. The chat bot platforms 104 may include any chat bot or automated/virtual assistant, which is any software agent that can perform tasks or services for an individual. The chat bot may receive commands via any acceptable form of input, such as audio inputs (e.g. speech) or text inputs (e.g., commands typed out using a keyboard or touchscreen). In some embodiments, the chat bot may be accessed by online chat. For example, the chat bot may receive messages via a messaging service, such as Facebook messenger. In some embodiments, the chat bot may be software installed on a device, such as on a personal computer, smartphone, or smart speaker. Examples of such chat bots include Apple's Siri, Google's Assistant, Amazon's Alexa, and Microsoft's Cortana.

In some embodiments, the digital assistant platform may include a set of task specific bots 116, and at least some of the task specific bots 116 may have been developed by third-party developers. Some of the developers may have a pre-existing relationship with the owner or operator of the digital assistant platform. For instance, the digital assistant platform may be owned and operated by a payment processor, while the developers may include merchants, issuers (of payment accounts, e.g., financial entities), and so forth. The third-party developers may build their own task specific bots 116 independently with their own identity. In some embodiments, developers may register their task specific bots 116 with the digital assistant platform, provided that the bots comply with the standardized guidelines, command interface, and security/authentication mechanisms of the digital assistant platform. In some embodiments, the digital assistant platform may learn about the capabilities of the various task specific bots 116 and add them to the bot registry 112, which may be a list of all the available task specific bots 116, their capabilities/uses, and the user intents served by them.

In some embodiments, a developer may register their task specific bot to have it added to the bot registry 112, so long as their bot complies with the standard web-hooks or API end-points associated with the digital assistant platform. For instance, a task specific bot may have to be configured to provide a description of the bot that could be used in the bot exchange 114, a URL to the icon (image) of the bot that could be used in the exchange and also inline within conversations (e.g., with a chat bot platform 104) for "source attribution". The task specific bot may also be configured to provide a list of actions that can be performed by the bot, and the actions metadata may have to be provided in a standard format and specify the list of intents that are served by each action. This actions metadata may be versioned so that only approved intents/actions can be served in the bot exchange 114. In some embodiments, the digital assistant platform may include some editorial processes that ensure the bots and their actions are reviewed to be compliant with the quality/policy guidelines of the digital assistant platform before they go live on the platform. The task specific bot may also be configured to provide an interface for the cross-platform bot and/or any of the other available bots to pass commands to the task specific bot. The cross-platform bot may provide a method for authenticating and/or authorizing interactions between bots. This method may include the use of a bot policy server 120.

In some embodiments, the bot policy server 120 can control the bot chaining process. The bot policy server 120 may manage authentication tokens that the bots use to send commands to each other. For example, a bot may need authorization to chain with a value processing bot or a payment gateway bot, and such authentication tokens may be used as permission to chain bots.

In some embodiments, a user 102 may issue a conversational command to the chat bot platform 104 (e.g., in the form of typed text or audio). This conversational command may include a set of instructions that the user 102 wishes the chat bot platform 104 to perform, such as: "book me a plane ticket to New York City."

The chat bot platform 104 may send the conversational command issued by the user 102 (e.g., user input) to the cross-platform bot 106. There may be multiple chat bot platforms 104 that the user 102 can use, and thus, the cross-platform bot 106 may receive conversational commands from any available chat bot platforms 104 that the user 102 issues commands to. Instead of the chat bot platforms 104 interpreting and performing those conversational commands, they forward the commands to the cross-platform bot 106 to interpret and perform. Thus, the cross-platform bot 106 acts as the backend for the various chat bot platforms 104, all of which have the role of bridging the user with the cross-platform bot 106.

In some embodiments, the chat bot platform 104 may have the conversational command in audio format and may send the conversational command to the cross-platform bot 106 as audio. In such embodiments, the cross-platform bot 106 may convert the audio to text upon receiving the conversational command. In other embodiments, the chat bot platform 104 may have the conversational command in an audio format and may convert it to text format before sending it to the cross-platform bot 106. In some embodiments, the chat bot platform 104 may have the conversational command in text format and may send the conversational command to the cross-platform bot 106 as text.

Once the cross-platform bot 106 receives the conversational command, it may first reference the conversational command against the conversation context store 108 in order to determine if the conversational command designates any particular task specific bots 116 to carry out the conversational command. If the cross-platform bot 106 can determine, from the conversational command, that the conversational command designates one or more task specific bots 116, then the cross-platform bot 106 may send the conversational command to those task specific bots 116 to carry out the conversational command.

The conversation context store 108 can store context for a given interaction. Bots involved in an interaction can add context to the conversation context store as context is collected over the course of the interaction. This can allow the context to be accessed by any bot that needs information collected by a different bot, without needing the bots to pass along all context.

Otherwise, if the cross-platform bot 106 cannot determine if any task specific bots 116 are designated in the conversational command, the cross-platform bot 106 may send the conversational command to the intent analyzer 110. The intent analyzer 110 may then determine the user's intent from the conversational command. There may be multiple methods of determining the user's intent from the conversational command and any acceptable method may be used.

Once the intent analyzer 110 determines the user's intent, the intent analyzer may check the bot registry 112 in order to determine if there are any task specific bots 116 to use that can carry out the user's intent. The bot registry 112 may be a list of all the available task specific bots 116 and their uses. In some embodiments, if multiple task specific bots 116 have similar uses and are capable of serving the same intent, then the bot exchange 114 may enable the developers of those bots to bid for their bot's priority in real-time. The bot registry 112 may keep track of the bots that have been awarded priority. Thus, if there is a single bot listed in the bot registry 112 that can carry out the user's intent, then the intent analyzer 110 may simply select that particular task specific bot 116 and forward the conversational command to that task specific bot 116 to carry out the command. However, if there are multiple bots listed in the bot registry 112 that can carry out the user's intent, then the intent analyzer 110 may select the task specific bot 116 that has priority and forward the conversational command to that task specific bot 116 to carry out the command. Thus, the digital assistant platform may be able to leverage the bot registry 112 to provide the appropriate task specific bot 116 to a user based on their intent, without the user needing to know the various available task specific bots listed in the bot registry 112 and each of their capabilities.

In some cases, a task specific bot 116 may utilize the functionality of another task specific bot or the universal bots 118 to carry out the user's command. This feature is described herein as bot chaining and it is enabled by the digital assistant platform having a single set of standards and protocols (e.g., command interface conventions, APIs, and so forth) that developers adhere to with their task specific bots. In some embodiments, the cross-platform bot 106 may take the conversational command and, after analyzing the intent of the command, the cross-platform bot 106 may build the appropriate bot chain and orchestrate the communications flow between those bots. The cross-platform bot 106 may leverage the conversation context store 108 to share relevant context across the various bots in the chain.

In some embodiments, once the user's conversational command is passed to the task specific bot 116, all future messages from the user may be relayed to the bot directly (and vice-versa for the bot responses) until the bot closes its part of the conversation.

Figure 2:
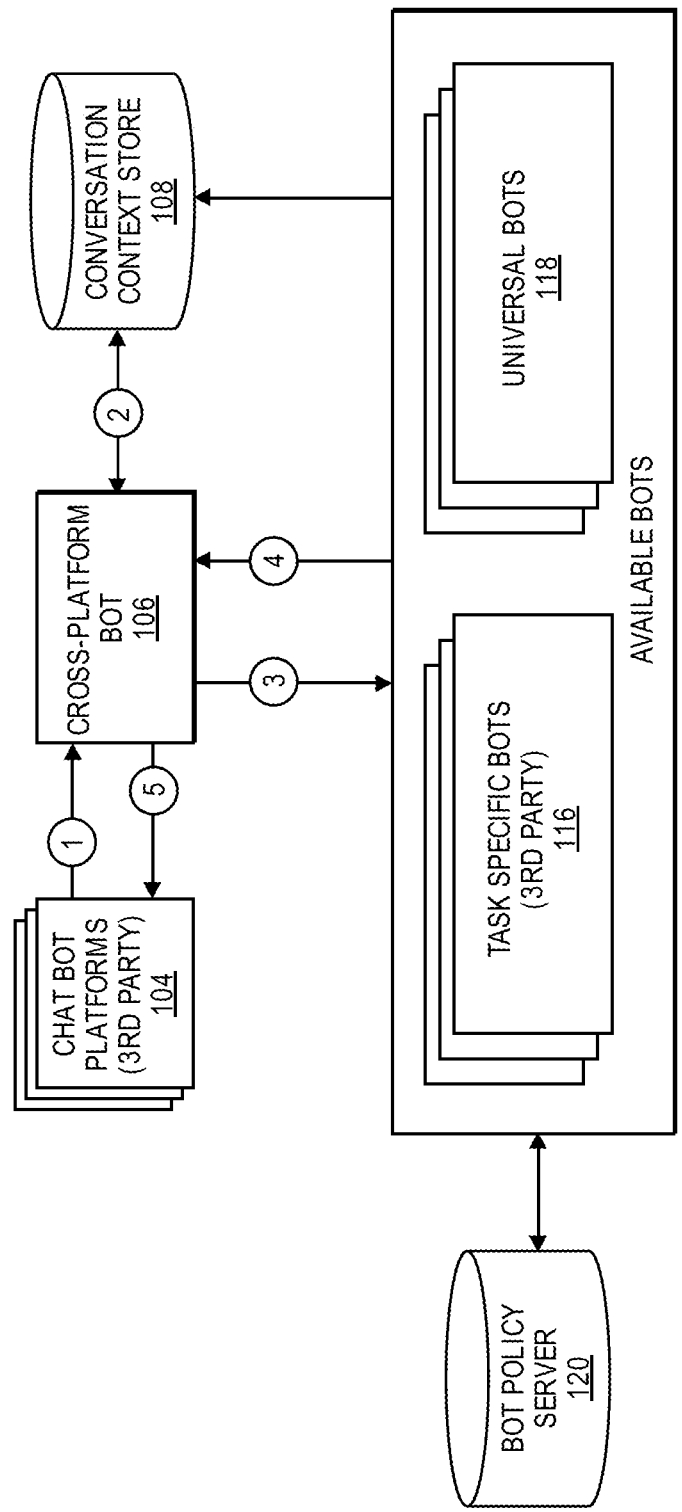
FIG. 2 is a block diagram illustrating a process of a digital assistant platform, in accordance with embodiments of the present disclosure.

FIG. 2 is a block diagram illustrating a process of a digital assistant platform, in accordance with embodiments of the present disclosure.

At circle 1, the chat bot platform 104 may send a conversational command received from a user to the cross-platform bot 106, in the form of typed text or audio. This conversation command may include a set of instructions that the user wishes automated assistance on.

At circle 2, the cross-platform bot 106 may reference the conversational command against the conversation context store 108 in order to determine if the conversational command designates any particular task specific bots 116 to carry out the conversational command.

At circle 3, if the cross-platform bot 106 had determined, from the conversational command, that the conversational command designates one or more task specific bots 116, then the cross-platform bot 106 would send the conversational command to those task specific bots 116 to carry out the conversational command. The one or more designated task specific bots 116 would carry out the command, in some cases with the use of universal bots 118. In order to communicate with other available bots, the bot policy server 120 may be required. A task specific bot 116 may request a token from the bot policy server 120, then use that token when passing a command to another task specific bot 116 or a universal bot 118. As the designated task specific bots 116 and the universal bots 118 carry out the command, the conversation context store can be updated with any additional context.

At circle 4, after the task specific bots 116 carry out the command, the task specific bots 116 may send an acknowledgement back to the cross-platform bot 106. This acknowledgement may notify the cross-platform bot 106 that the command has been completed as requested. This acknowledgement may also include information or details associated with the completed task. For instance, if the command involved booking a plane ticket to New York City, this acknowledgment may contain the details of the purchased plane ticket, such as the airline, flight number, flight itinerary, and so forth.

At circle 5, the cross-platform bot 106 may also send an acknowledgement or notification to the chat bot platform 104 that it received the conversational command from. This acknowledgement may notify the chat bot platform 104 that the command has been completed as requested. This acknowledgement may also include information or details associated with the completed task, which would allow the chat bot platform 104 to inform the user that their requested task was completed to specification. For instance, if the command involved booking a plane ticket to New York City, this acknowledgment may also contain the details of the purchased plane ticket, such as the airline, flight number, flight itinerary, and so forth. Thus, when the chat bot platform 104 notifies the user that the plane ticket has been booked, it could also inform the user that a flight to New York on X airline, with a time and date of Y, was successfully booked.

Figure 3:
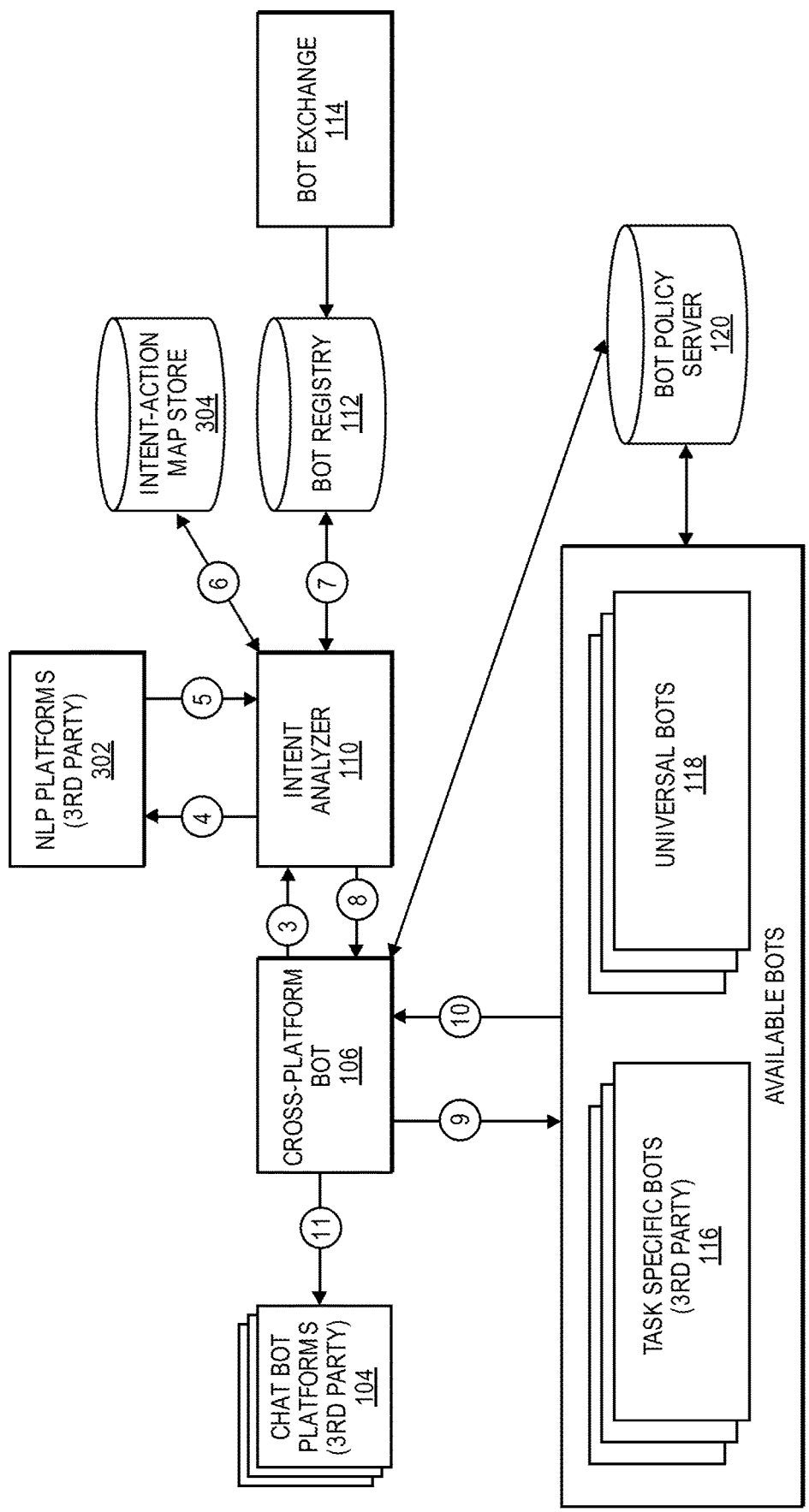
FIG. 3 is a block diagram of a digital assistant platform, in accordance with embodiments of the present disclosure. A process flow is also illustrated in FIG. 3.

FIG. 3 is a block diagram illustrating a process of a digital assistant platform, in accordance with embodiments of the present disclosure.

FIG. 3 is best interpreted in light of FIG. 2 (e.g., as a supplement). In particular, FIG. 3 illustrates actions performed by the digital assistant platform if the cross-platform bot 106 cannot directly determine a task specific bot 116 to use from the conversational command (e.g., if the cross-platform bot 106 does not find prior context for the conversation in the conversation context store 108).

Thus, at circle 3, if the cross-platform bot 106 cannot determine if any task specific bots 116 are designated in the conversational command, the cross-platform bot 106 may send the conversational command to the intent analyzer 110. The cross-platform bot 106 seeks to try to understand the intent of the user and bring in the one or more appropriate bots to complete the task.

At circle 4, the intent analyzer 110 may provide the conversational command to one or more neuro-linguistic programming (NLP) platforms 302 in order to determine the intent of the conversational command. The same set of NLP platforms 302 could be used by the task specific bots in the ecosystem as well, or they may also utilize the intent analyzer 110.

At circle 5, the NLP platforms 302 may provide the intent analyzer 110 with the possible intent(s) of the conversational command. For instance, an audio clip of the command "book a plane ticket" which has a poor pronunciation of the word "plane" may sound like a command to either book a plane ticket or a train ticket. Thus, the intent analyzer 110 could be informed that the intent of the conversational command is either to book a plane ticket or a train ticket. The intent analyzer 110 would have to determine which is the most-likely intent behind the conversational command.

At circle 6, the intent analyzer 110 may compare the intent against an intent-action map store 304, in order to determine a set of actions associated with the intent. For instance, if the conversational command was "book a flight to New York and a hotel for when I land", the intent of that conversational command includes numerous separate actions (e.g., booking a flight and booking a hotel). Thus, the intent-action map store 304 would enable the intent analyzer 110 to break down the intent into its underlying actions.

At circle 7, the intent analyzer 110 may reference the actions against the bot registry 112, in order to determine one or more task specific bots 116 to use for carrying out the user's intent. The bot registry 112 may be a list of all the available task specific bots 116 and their uses. In some embodiments, if multiple task specific bots 116 have similar uses, then the bot exchange 114 may enable the developers of those bots to bid for their bot's priority in real-time. The bot registry 112 may keep track of the bots that have been awarded priority.

In the prior example, where the conversational command was "book a flight to New York and a hotel for when I land", the bot registry 112 may provide details on one or more flight-booking bots (e.g., developed by an airline or travel agency, such as Kayak, Priceline, Expedia, and so forth) and one or more hotel-booking bots (e.g., developed by a hotel company or travel agency). If there are multiple bots for performing one action (e.g., there are multiple flight-booking bots), the intent analyzer 110 may select the bot that has been awarded priority. For instance, if there are three flight-booking bots (e.g., bots A, B, and C, with bot C awarded priority) and two hotel-booking bots (e.g., bots X and Y, with bot X awarded priority), then the intent analyzer 110 would select bot C to book the flight and bot X to book the hotel.

At circle 8, the intent analyzer 110 would communicate to the cross-platform bot 106 the actions determined from the conversational command and the bot(s) that the intent analyzer 110 has selected for performing those actions.

At circle 9, the cross-platform bot 106 may send the selected task specific bots 116 the actions to perform. The one or more designated task specific bots 116 would carry out the actions, which may require the task specific bots 116 to communicate among each other (e.g., bot chaining) and/or utilize the universal bots 118 to carry out the actions. The universal bots 118 may comprise common bots integrated into the overall platform that can be utilized by all the task specific bots 116. A task specific bot 116 may request a token from the bot policy server 120, then use that token when passing a command to another task specific bot 116 or a universal bot 118. As the designated task specific bots 116 and the universal bots 118 carry out the command, the conversation context store 108 can be updated with any additional context.

At circle 10, after the task specific bots 116 carry out the command, the task specific bots 116 may send an acknowledgement back to the cross-platform bot 106. This acknowledgement may notify the cross-platform bot 106 that the command has been completed as requested, along with information or details associated with the completed task. There may be separate acknowledgements sent if multiple task specific bots 116 were utilized. For instance, if the command involved booking a plane ticket to New York City and a hotel in New York City, the flight-booking bot may send an acknowledgment that contains the details of the purchased plane ticket, such as the airline, flight number, flight itinerary, and so forth. The hotel-booking bot may send an acknowledgment that contains the details of the reserved hotel room, such as the hotel name, room number, room type, date(s) of the reservation, checkout times, and so forth.

At circle 11, the cross-platform bot 106 may also send an acknowledgement or notification to the chat bot platform 104 that it received the conversational command from. This acknowledgement may notify the chat bot platform 104 that the command has been completed as requested, as well as any information or details associated with the completed task (e.g., any of the details received at circle 10). Thus, in the previous example, when the chat bot platform 104 notifies the user that the plane ticket has been booked and a hotel room has been reserved, it could also inform the user that a flight to New York on X airline, with a time and date of Y, was successfully booked, and that the user will be staying at hotel CA.

Figure 4A:
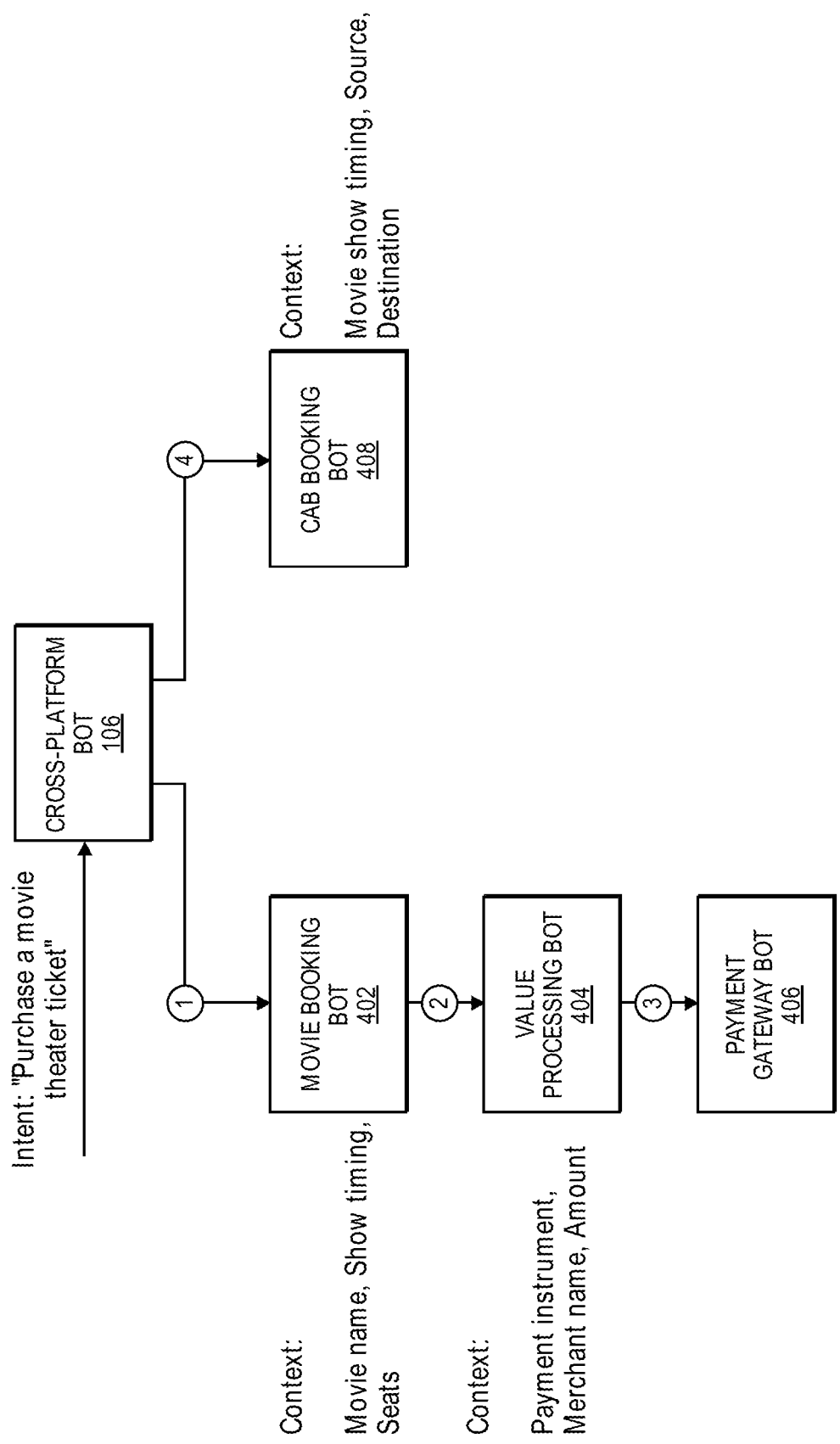
FIG. 4A is a block diagram illustrating a process of a digital assistant platform, in accordance with embodiments of the present disclosure.

FIG. 4A is a block diagram illustrating a process of a digital assistant platform, in accordance with embodiments of the present disclosure.

In particular, FIG. 4A serves to introduce some examples of universal bots (e.g., universal bots 118) that can be integrated into the digital assistant platform.

As an example, the conversational command, with the intent of "purchase a movie ticket", may be sent to the cross-platform bot 106. Once the cross-platform bot 106 understands the intent of the command, at circle 1, it may send the command to the movie booking bot 402. In some embodiments, the cross-platform bot 106 may instruct the movie booking bot 402 by providing additional context associated with booking a movie. This context may include the preferred movie theater, the movie name, the show timing, and the preferred seats. This additional context may have been provided in the conversational command itself or may be a part of the user's preferences that have been saved with the movie booking bot 402. For instance, the conversational command may have been, "purchase a movie ticket for movie CA', showing tonight at time CB' at movie theater 'C', for seats close to the middle of the theater." Or, the conversational command may have been, "purchase a movie ticket for movie CA' at time 'B'," and the user's saved preferences with the movie booking bot 402 may include movie theater 'C' and/or the user's preferred seating. Thus, the movie booking bot 402 may be able to fill in the missing necessary context that was not provided in the conversational command.

Alternatively, if there is any additional context required by the movie booking bot 402, the movie booking bot 402 may request that the cross-platform bot 106 go back and ask the user to supply the additional context. For instance, if the conversational command was simply, "purchase a movie ticket for 'A' movie", the cross-platform bot 106 may have to request that the user supply the show time and movie theater information needed to purchase the movie ticket.

In some embodiments, the movie booking bot 402 may purchase the movie ticket by utilizing bot-chaining, which allows the movie booking bot 402 to take advantage of the functionality of other bots, such as universal bots (e.g., value processing bot 404 and payment gateway bot 406).

In some embodiments, the value processing bot 404 may be chained by any other bot that needs the user to validate their identity to provide access to an account (e.g., a payment account or a digital wallet), which may include identifier information (e.g., credit card information), preferred shipping addresses, and additional profile information. The value processing bot 404 may utilize a standardized authentication protocol (e.g., Open ID) supported by most chat bot platforms. In some embodiments, the value processing bot 404 may use 2-factor authentication to authenticate the user and provide a unique token that can be passed on to the payment gateway bot 406 in order to complete a transaction or back to the merchant bot (e.g., movie booking bot 402) to perform the transaction on the merchant's server-side.

For instance, at circle 2, upon selecting the movie ticket to purchase, the movie booking bot 402 may instruct the value processing bot 404 to make the transaction. In some embodiments, the movie booking bot 402 may provide additional context with the transaction, such as the payment amount (e.g., the price of the movie ticket), the merchant name (e.g., the movie theater), and the payment instrument (e.g., the instrument to make the transaction with, such as the credit card payment account). Some of this context, such as the payment amount and merchant name, may be retrieved by the movie booking bot 402 (e.g. by contacting a server associated with the merchant). Additional context, such as the payment instrument, may have been provided in the conversational command itself, or may be a part of the user's preferences that have been saved with the movie booking bot 402 or the value processing bot 404.

Alternatively, if there is any additional context required by the value processing bot 404, the value processing bot 404 may request that the cross-platform bot 106 go back and ask the user to supply the additional context. For instance, if the value processing bot 404 is aware of the payment amount and merchant name, but was not supplied with a payment instrument, then the cross-platform bot 106 may have to request that the user supply the desired payment instrument with which to perform the transaction.

In some embodiments, the movie booking bot 402 may need authorization to chain with the value processing bot 404. To do so, the movie booking bot may send a token request to a bot policy server 120. The bot policy server 120 may check to see if the movie booking bot 402 is authorized to request transactions, and if so, it may return a token to the movie booking bot 402. The movie booking bot 402 may then present the authorization token to the value processing bot 404 along with the instruction to make the transaction.

At circle 3, the value processing bot 404 may have the payment gateway bot 406 complete the payment.

At circle 4, the cross-platform bot 106 may also suggest to the user the possibility of booking a taxi to the movie theater. If the user agrees, then the cross-platform bot 106 may instruct the cab booking bot 408 to book a taxi based on a supplied context. Since the taxi must be scheduled based on the movie time, this context may include the movie show timing, the source address (e.g., the user's residence), and the destination address (e.g., the movie theater address). Some of this context associated with booking the taxi may be supplied by the cross-platform bot 106 and/or the movie booking bot 402. The cross-platform bot 106 and/or the movie booking bot 402 may make context available by sending it to the conversation context store 108, where the cab booking bot 408 can access it. In particular, the movie booking bot 402 may be able to supply the movie show timing and the movie theater address for the movie ticket that was purchased. Any additional context that is missing may be retrieved as a part of the user's preferences that have been saved with the cross-platform bot 106, the movie booking bot 402, or the cab booking bot 408. Alternatively, if there is any additional context required by the cab booking bot 408, the cab booking bot 408 may request that the cross-platform bot 106 go back and ask the user to supply the additional context. For instance, if the cab booking bot 408 does not know where the user would like to be picked up from, then the cross-platform bot 106 may have to request that the user supply that information rather than assuming that the taxi should pick the user up from their residence. Any additional context that is collected may also be added to the conversation context store 108. The context may persist in the conversation context store 108 until the end of the user's interaction.

Figure 4B:
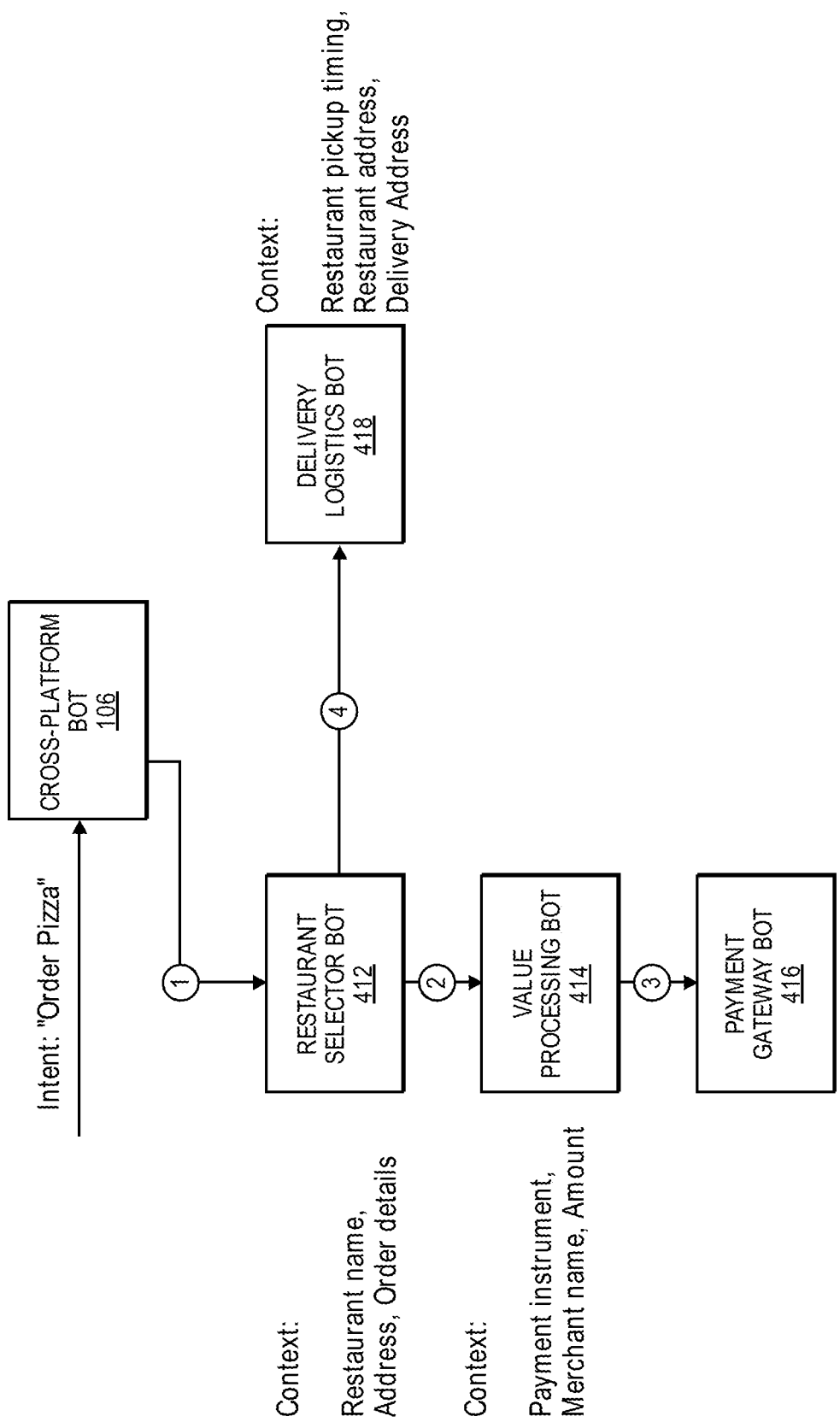
FIG. 4B is a block diagram illustrating a process of a digital assistant platform, in accordance with embodiments of the present disclosure.

FIG. 4B is a block diagram illustrating a process of a digital assistant platform system, in accordance with embodiments of the present disclosure.

In particular, FIG. 4B serves to illustrate how bot chaining may function to allow bots to chain commands among themselves. The digital assistant platform may allow for bots to manage their own chaining, subject to some restrictions. For example, only authorized task specific bots may be allowed to chain themselves to one of the universal bots provided by the digital assistant platform. Bot authorization may be managed by the bot policy server. For example, a bot maybe need to request an authorization token from the bot policy server before chaining to one of the universal bots.

As an example, the conversational command, with the intent of "order pizza", may be sent to the cross-platform bot 106. Once the cross-platform bot 106 understands the intent of the command, at circle 1, it may send the command to the restaurant selector bot 412. In some embodiments, the cross-platform bot 106 may instruct the restaurant selector bot 412 by providing additional context associated with ordering a pizza. This context may be made context available by sending it to the conversation context store 108, where the restaurant selector bot 412 can access it. The context may include the restaurant name, the delivery address, and details of the order (e.g., what pizza and toppings). This additional context may have been provided in the conversational command itself, or may be a part of the user's preferences that have been saved with the restaurant selector bot 412. For instance, the conversational command may have been, "order a large cheese pizza from restaurant 'A' to be delivered to my home," and the restaurant selector bot 412 would know to place an order with restaurant 'A' for delivery to the user's address, which could be saved in the user's preferences. Or, if the conversational command were simply "order a large cheese pizza from restaurant 'A',", the restaurant selector bot 412 may fill in the missing context (e.g., if the intent of the command is to deliver the pizza to the user's residence, the restaurant selector bot 412 can use the user's home address if it is available in the user's preferences.

Alternatively, if there is any additional context required by the restaurant selector bot 412, the restaurant selector bot 412 may request that the cross-platform bot 106 go back and ask the user to supply the additional context. For instance, if the conversational command was simply, "order a pizza", the cross-platform bot 106 may have to request that the user provide additional details such as what kind of pizza, where to order the pizza from, and where to deliver the pizza to. Any additional context that is collected may also be added to the conversation context store 108. The context may persist in the conversation context store 108 until the end of the user's interaction.

If the restaurant selector bot 412 is capable of bot-chaining, the restaurant selector bot 412 may be able to utilize the functionality of other bots, such as universal bots (e.g., value processing bot 414 and payment gateway bot 416). At circle 2, the restaurant selector bot 412 may instruct the value processing bot 414 to make the transaction. In some embodiments, the restaurant selector bot 412 may provide additional context with the transaction, such as the payment amount (e.g., the price of the order), the merchant name (e.g., the restaurant), and the payment instrument (e.g., the instrument to make the transaction with, such as the credit card payment account). Some of this context, such as the payment amount and merchant name, may be retrieved by the restaurant selector bot 412 (e.g. by contacting a server associated with the merchant). Additional context, such as the payment instrument, may have been provided in the conversational command itself, or may be a part of the user's preferences that have been saved with the restaurant selector bot 412 or the value processing bot 414.

Alternatively, if there is any additional context required by the value processing bot 414, the value processing bot 414 may request that the cross-platform bot 106 go back and ask the user to supply the additional context. For instance, if the value processing bot 414 is aware of the payment amount and merchant name, but was not supplied with a payment instrument, then the cross-platform bot 106 may have to request that the user supply the desired payment instrument with which to use to order the pizza.

At circle 3, the value processing bot 414 may have the payment gateway bot 416 complete the payment.

At circle 4, the restaurant selector bot 412 may also perform bot-chaining by automatically sending instructions to a delivery logistics bot 418, along with additional context that can be used by the delivery logistics bot 418 (e.g., such as for Uber Eats). For example, a delivery service may be utilized to deliver the pizza if it has certain information, such as restaurant pickup timing, the restaurant address, and the delivery address. Most of this context associated with delivering the pizza may be supplied by the cross-platform bot 106 and/or the restaurant selector bot 412. In particular, the restaurant selector bot 412 may be able to supply the restaurant pickup timing, the restaurant address, and the delivery address. Thus, in this case, the restaurant selector bot 412 could seamlessly perform bot-chaining to have the delivery logistics bot 418 set up delivery of the pizza, without having to request the user to provide additional context for the delivery service.

Figure 5:
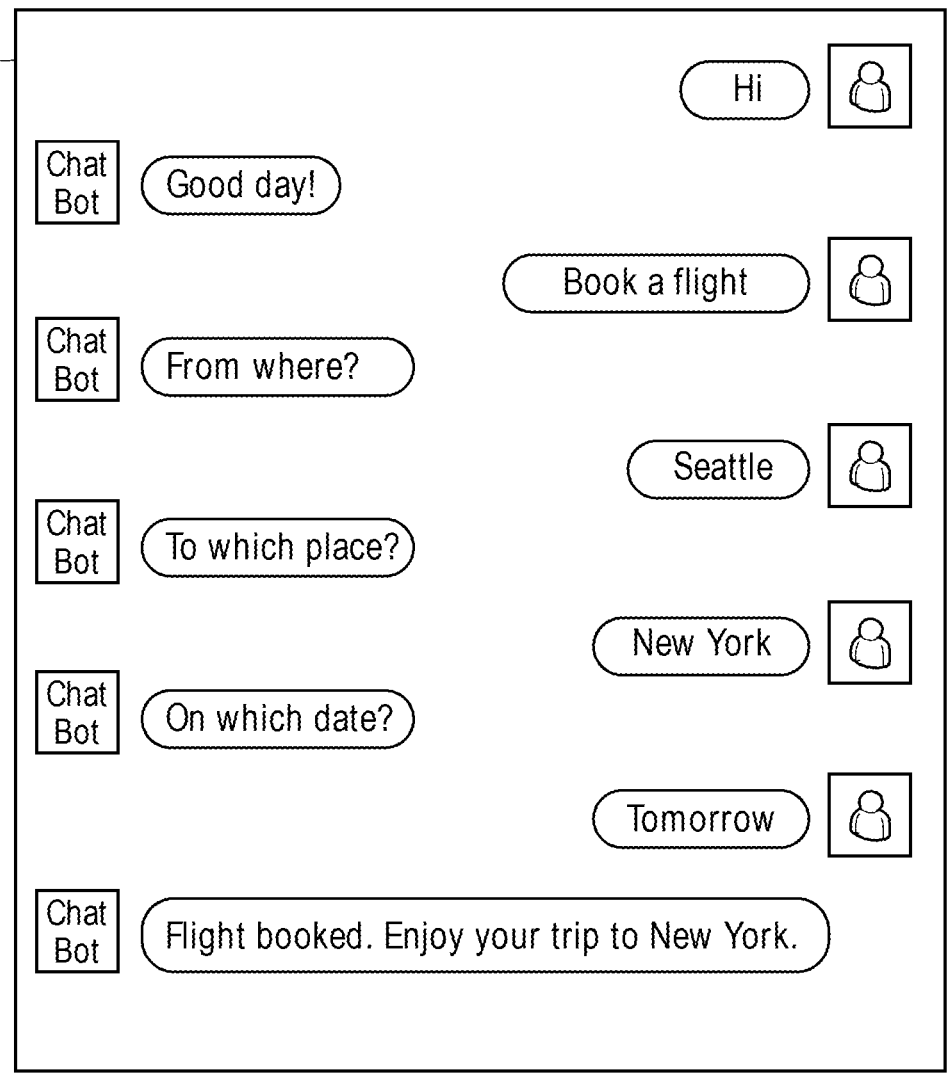
FIG. 5 is an illustration of an user interface of a chat bot as seen by a user, in accordance with embodiments of the present disclosure.

FIG. 5 is an illustration of a user interface of a chat bot as seen by a user, in accordance with embodiments of the present disclosure.

The user interface 500 may be a chat interface seen by a user of a chat bot that is integrated into a messaging system, such as an online messaging service (e.g., Facebook Messenger). The user types commands into the interface to interact with the chat bot. In this example, the user has instructed the chat bot to "book a flight." This conversational command is received by the chat bot, which forwards it to a cross-platform bot (e.g., cross-platform bot 106) to handle. The cross-platform bot would then analyze the context provided in the conversational command or the underlying intent of the conversational command. However, in this specific example, since the user has not provided sufficient context to the chat bot regarding the details of which flight to book, the cross-platform bot would have to coordinate with the chat bot to request the necessary context.

The chat bot is shown carrying on a conversation with the user to learn of the source city (Seattle), the destination city (New York), and the date of the flight (tomorrow). After obtaining all the missing context, the chat bot can forward this information to the cross-platform bot. The cross-platform bot can then use all this information in order to determine and select the appropriate task specific bot for booking the flight.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents. It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software. Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

A recitation of "a", "an" or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

What is claimed is:

1. A computer-implemented method, comprising:
obtaining, from a chat-bot platform, a conversational command provided by a user, wherein the conversational command instructs performance of a task;
determining whether the conversational command designates a task specific bot for performance of the task;
upon determining that the conversational command cannot determine a single task specific bot for performance of the task, then analyzing an intent of the conversational command;
determining that the intent of the conversational command indicates a plurality of actions;
determining two or more task specific bots for performance of the plurality of actions associated with the task based on the intent of the conversational command and a bot registry, wherein the bot registry lists the two or more task specific bots and functionality associated with each of the two or more task specific bots and wherein at least one of the two or more specific task bots is selected from a plurality of task bots that can perform tasks based upon one of the plurality of actions associated with the task using a real-time bidding process; and
providing the conversational command or portions thereof to the determined two or more task specific bots for performance of the task.

2. The method of claim 1, wherein the two or more task specific bots are added to the bot registry by a developer of each respective task specific bot.

3. The method of claim 1, wherein analyzing the intent of the conversational command includes referencing the intent of the conversational command in an intent-action map store.

4. The method of claim 1, wherein the bot registry further lists the two or more task specific bots based on interactions conducted in a bot exchange.

5. The method of claim 1, wherein the bot registry further includes interaction results associated with each of the two or more task specific bots, wherein the interaction results are conducted in a bot exchange.

6. The method of claim 1, wherein the determined two or more task specific bots perform bot chaining for performance of the task.

7. The method of claim 6, wherein bot chaining is managed by a bot policy server.

8. The method of claim 1, wherein at least one of the determined two or more task specific bots is a value processing bot.

9. The method of claim 1, wherein the conversational command is provided by the user as a voice command.

10. A computing system, comprising:
one or more processors;
non-transitory computer-readable memory storing instructions that, when executed by the one or more processors, cause the one or more processors to:
obtain, from a chat-bot platform, a conversational command provided by a user, wherein the conversational command instructs performance of a task;
determine whether the conversational command designates a task specific bot for performance of the task;
upon determining that the conversational command cannot determine a single task specific bot for performance of the task, then analyzing an intent of the conversational command;
determine that the intent of the conversational command indicates a plurality of actions;
determine two or more task specific bots for performance of the plurality of actions associated with the task based on the intent of the conversational command and a bot registry, wherein the bot registry lists the two or more task specific bots and functionality associated with each of the one or more task specific bots and wherein at least one of the two or more specific task bots is selected from a plurality of task bots that can perform tasks based upon one of the plurality of actions associated with the task using a real-time bidding process; and
provide the conversational command or portions thereof to the determined two or more task specific bots for performance of the task.

11. The computing system of claim 10, wherein the two or more task specific bots are added to the bot registry by a developer of each respective task specific bot in the two or more task specific bots.

12. The computing system of claim 10, wherein analyzing the intent of the conversational command includes referencing the intent of the conversational command in an intent-action map store.

13. The computing system of claim 10, wherein the bot registry further lists the two or more task specific bots based on interactions conducted in a bot exchange.

14. The computing system of claim 10, wherein the bot registry further includes interaction results associated with each of the two or more task specific bots, wherein the interaction results are conducted in a bot exchange.

15. The computing system of claim 10, wherein the determined two or more task specific bots perform bot chaining for performance of the task.

16. The computing system of claim 15, wherein a bot policy server manages bot chaining.

17. The computing system of claim 10, wherein at least one of the determined two or more task specific bots is a value processing bot.

18. The computing system of claim 10, wherein the conversational command is provided by the user as a voice command.

19. The method of claim 1, wherein at least one of the two or more specific task bots is selected from a set of task bots in the plurality of task bots, wherein the tasks bots in the set of tasks bots can perform tasks based upon a same action.

* * * * *